(12) United States Patent
Woo

(10) Patent No.: US 9,624,584 B2
(45) Date of Patent: Apr. 18, 2017

(54) COATING METHOD USING ENAMEL AND EQUIPMENT FOR CARRYING OUT THE METHOD

(71) Applicant: BHI CO., LTD., Haman-gun, Gyeongsangnam-do (KR)

(72) Inventor: Jong Inn Woo, Haman-gun (KR)

(73) Assignee: BHI CO., LTD., Gunbuk-Myeon (KR)

( * ) Notice: Subject to any disclaimer, the term of this patent is extended or adjusted under 35 U.S.C. 154(b) by 37 days.

(21) Appl. No.: 14/300,994

(22) Filed: Jun. 10, 2014

(65) Prior Publication Data

US 2015/0354066 A1 Dec. 10, 2015

(51) Int. Cl.

| | |
|---|---|
| *C23D 11/00* | (2006.01) |
| *C23D 5/02* | (2006.01) |
| *B05C 11/06* | (2006.01) |
| *B05C 5/02* | (2006.01) |
| *B05C 19/04* | (2006.01) |
| *C23D 3/00* | (2006.01) |
| *C23D 5/00* | (2006.01) |
| *C23D 9/10* | (2006.01) |
| *F27D 99/00* | (2010.01) |

(52) U.S. Cl.
CPC .............. *C23D 5/02* (2013.01); *B05C 5/0241* (2013.01); *B05C 11/06* (2013.01); *B05C 19/04* (2013.01); *C23D 3/00* (2013.01); *C23D 5/005* (2013.01); *B05C 5/025* (2013.01); *C23D 9/10* (2013.01); *F27D 2099/0015* (2013.01); *Y02P 10/253* (2015.11); *Y10S 118/11* (2013.01); *Y10S 118/13* (2013.01)

(58) Field of Classification Search
CPC ....... B05C 19/04; B05C 11/06; B05C 5/0241; B05C 5/025; Y10S 118/11; Y10S 118/13; Y10S 118/22; Y10T 29/5199; Y10T 29/5185; Y10T 29/5134; B05B 13/0221; B05B 13/0214; B05B 13/0235; C23D 5/02; C23D 5/005; C23D 3/00; C23D 9/10
USPC .............. 72/38, 46, 37; 118/62, 63, 66, 320, 118/DIG. 11
See application file for complete search history.

(56) References Cited

U.S. PATENT DOCUMENTS 3,108,022 A * 10/1963 Church .................. B05C 19/02
118/404
4,304,822 A * 12/1981 Heyl ........................ B05D 1/30
138/146
4,410,126 A * 10/1983 O'Rourke ................ B23K 1/08
118/63

(Continued)

FOREIGN PATENT DOCUMENTS

| JP | 56169143 | * 12/1981 |
|---|---|---|
| KR | 10-1074438 | * 10/2011 |

*Primary Examiner* — Laura Edwards
(74) *Attorney, Agent, or Firm* — Stein IP, LLC

(57) ABSTRACT

Provided are an enamel coating method and apparatus. The enamel coating method includes (a) preprocessing a surface of the metal tube by feeding the metal tube into a preprocessing chamber by an in-feed conveyor; (b) coating the surface of the metal tube with an enamel glaze supplied from an enamel glaze supply nozzle provided inside a coating chamber by feeding the preprocessed metal tube into the coating chamber; and (c) firing the coated metal tube by feeding the coated metal tube into a firing chamber, wherein the (b) coating includes spraying air toward the metal tube by an air spray nozzle provided inside the coating chamber.

9 Claims, 12 Drawing Sheets

(56) References Cited

U.S. PATENT DOCUMENTS 6,030,371 A * 2/2000 Pursley ............ A61M 25/0009
427/195

* cited by examiner

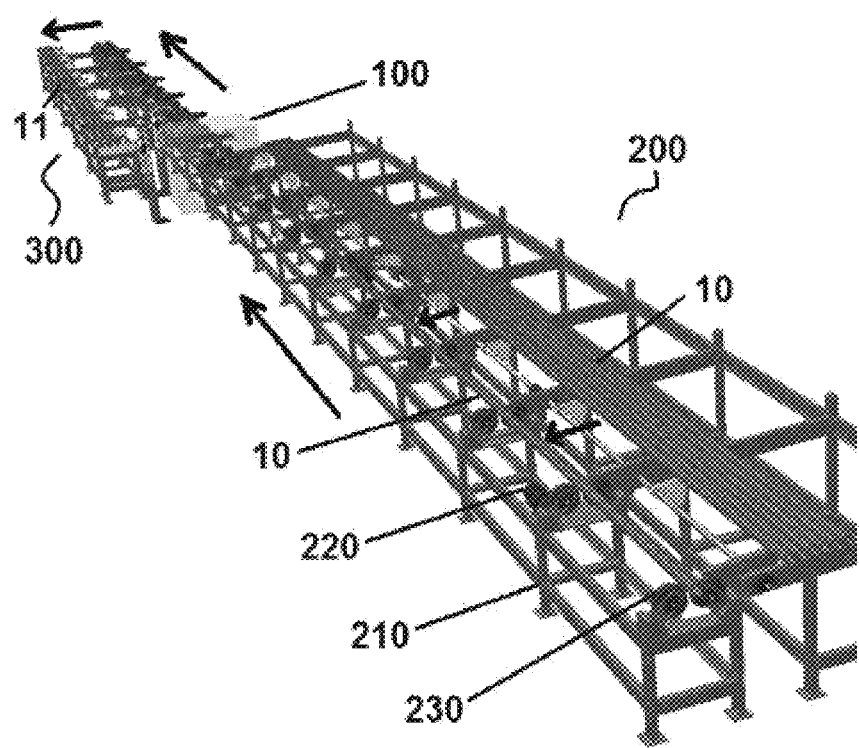

COATING METHOD USING ENAMEL AND EQUIPMENT FOR CARRYING OUT THE METHOD

BACKGROUND OF THE INVENTION

1. Field of the Invention

The present invention relates to an enamel coating method and an enamel coating apparatus using the same, and more particularly, to an enamel coating method and apparatus for a metal pin tube in which a heat transfer pin is formed on the surface thereof.

2. Description of the Related Art

There are many cases in which a metal tube is used in a highly humid environment, and therefore various types of coatings are applied to surfaces of the metal tube, the manhole cover, and the like in order to improve durability thereof. Among these, enamel coating has strong heat resistance and acid resistance characteristics, but is not widely used due to its difficult coating process such as requiring a firing process at a high temperature (750 to 1,000° C.).

In particular, since the firing process at the high temperature is required, it is difficult to secure economic efficiency when preparing a large scale firing chamber for the purpose of coating a long and bulky coating object with enamel. Thus, it is highly difficult to apply the enamel coating to the long and bulky coating object.

However, when coating a metal tube used in a harsh environment (when performing heat exchange using a gas containing acid components in a generator, a tube surface and a heat transfer pin are exposed to an acid dew point while the gas is cooled, and therefore a low temperature corrosion phenomenon occurs in a pin tube) such as a pin tube used as a heat exchanger for generator, with a general coating composition, the corroded metal tube should be replaced periodically, and therefore there are problems that cause inconvenience and high costs. In order to solve these problems, a metal tube made of a stainless steel or titanium-based material is used, but this requires high costs and cannot be the fundamental solution for acid corrosion even though the replacement cycle of the pin tube is increased. In addition, Teflon coating may be applied to the pin tube, but the Teflon material has a limitation in heat resistance. Accordingly, it can be desirable to apply the enamel coating to the metal tube which is used in the harsh environment requiring heat resistance and acid resistance.

Coating the surfaces of the metal tube with enamel is difficult for the following reasons.

First, as described above, a high-temperature firing chamber is required. In particular, when a length of the metal tube is large, a large-sized high temperature firing chamber is required.

Second, the metal tube is likely to be bent or distorted during coating while being subjected to the high temperature firing process. In this instance, as the length of the metal tube is increased, a frequency of the occurrence of this problem increases. Accordingly, a method for preventing such deformation of the metal tube when coating the metal tube is needed.

Third, oil-based components bonded to the surface of the metal tube in a preprocessing process hinder an aqueous enamel glaze from being bonded to the surface of the metal tube, and therefore it is necessary to remove the oil-based components before applying the enamel coating. However, through the conventional preprocessing processes, it is difficult to efficiently remove the oil-based components.

That is, a blasting process of the preprocessing process cannot efficiently remove the oil-based components, and when a wet process is introduced, the preprocessing process becomes complicated and causes deterioration in coating efficiency. Accordingly, there is a demand for a method for easily removing the oil-based components bonded to the surface of the metal tube.

Fourth, it is difficult to remove air bubbles formed within the coating film after coating with the enamel glaze. Removing the air bubbles formed in the coating film affects the coating quality, and is very important in the coating process. In particular, in a pin tube for a heat exchanger (see FIG. 10) in which a large number of heat transfer pins are formed on the surface of the metal tube, it is difficult to remove air bubbles formed on the surface of the tube and the heat transfer pin, but by efficiently removing such air bubbles, it is possible to manufacture the pin tube having excellent durability. Conventionally, a method of removing the air bubbles by tapping the metal tube has been used, but when coating a long metal tube, such a method is difficult to use and the effect is not significant.

Therefore, in order to take advantage of excellent properties of the enamel coating by applying the enamel coating to the metal tube, the above-described problems should be first solved.

SUMMARY OF THE INVENTION

The present invention is directed to an enamel coating method and apparatus which may readily remove excessive enamel glaze from the surface of the metal tube in a coating process of the enamel glaze, efficiently remove air bubbles formed inside a coating film, and prevent formation of an unsmooth coating surface formed in such a manner that the enamel glaze falls in the direction of gravity to be hardened in a firing process by primarily drying the enamel glaze applied to the surface of the metal tube in the previous step of the firing process.

Also, the present invention is directed to an enamel coating method and apparatus which may form a uniform and solid coating film by efficiently removing air bubbles formed on the surface of the metal tube in the coating process of the enamel glaze.

In particular, the present invention is directed to an enamel coating method and apparatus which may significantly readily remove air bubbles formed in every corner at the time of coating of the metal tube (for example, metal pin tube) so that it is difficult to remove the air bubbles in an existing method.

Also, the present invention is directed to an enamel coating method and apparatus which may completely remove oil-based components bonded to the surface of the metal tube within a short time in a preprocessing process.

Also, the present invention is directed to an enamel coating method and apparatus which may completely remove the oil-based components bonded to the surface of the metal tube in the preprocessing process, thereby minimizing coating defects and forming a uniform and solid coating film.

According to an aspect of the present invention, there is provided an enamel coating method including: (a) preprocessing a surface of the metal tube by feeding the metal tube into a preprocessing chamber by an in-feed conveyor; (b) coating the surface of the metal tube with an enamel glaze supplied from an enamel glaze supply nozzle provided inside a coating chamber by feeding the preprocessed metal tube into the coating chamber; and (c) firing the coated metal tube by feeding the coated metal tube into a firing chamber, wherein the (b) coating includes spraying air toward the metal tube by an air spray nozzle provided inside the coating chamber.

The air spray nozzle is provided behind the enamel glaze supply nozzle with respect to an advancing direction of the metal tube, and air is sprayed at a speed of 0.05 m/s to 1.5 m/s from the air spray nozzle.

The air sprayed from the air spray nozzle is hot air of 30 to 200° C.

The air spray nozzle sprays the air in a direction opposite to a rotating direction of the metal tube, and sprays the air such that the sprayed air reaches the lowest end of the metal tube.

A coating brush is further provided between the enamel glaze supply nozzle and the air spray nozzle inside the coating chamber in the (b) coating, and the (b) coating further includes removing excessive enamel glaze and air bubbles from the surface of the metal tube by the coating brush.

The metal tube is a pin tube for a heat exchanger in which a heat transfer pin is formed on a surface of the tube.

A heating means is provided in the preprocessing chamber in the (a) preprocessing, and the (a) preprocessing includes heating the metal tube to a temperature of 300 to 600° C. for 10 seconds to 4 minutes using the heating means.

The heating means is any one of an electric furnace, a plasma heat treatment furnace, a heavy oil furnace, a light oil furnace, a gas furnace, a hydrogen heat treatment furnace, and an induction heating furnace.

The heating means is an induction heater as the induction heating furnace.

The (a) preprocessing further includes performing wet preprocessing using ultrasound.

An enamel coating apparatus comprising: a preprocessing chamber that preprocesses a surface of a metal tube fed from an in-feed conveyor while being rotated; a coating chamber that coats the surface of the metal tube with an enamel glaze supplied from an enamel glaze supply nozzle provided therein when the preprocessed metal tube is fed; and a coating unit that includes a firing chamber for firing the coated metal tube when the coated metal tube is fed, wherein an air spray nozzle for spraying air toward the metal tube is provided inside the coating chamber.

The air spray nozzle is provided behind the enamel glaze supply nozzle with respect to an advancing direction of the metal tube, and air is sprayed at a speed of 0.05 m/s to 1.5 m/s from the air spray nozzle.

The air spray nozzle is a hot air spray nozzle capable of spraying hot air of 30 to 200° C.

The air spray nozzle sprays the air in a direction opposite to a rotating direction of the metal tube, and is provided such that the sprayed air reaches the lowest end of the metal tube.

A coating brush is further provided between the enamel glaze supply nozzle and the air spray nozzle.

A heating means capable of heating the metal tube to a temperature of 300 to 600° C. is provided in the preprocessing chamber.

The heating means is any one of an electric furnace, a plasma heat treatment furnace, a heavy oil furnace, a light oil furnace, a gas furnace, a hydrogen heat treatment furnace, and an induction heating furnace.

The heating means is an induction heater as the induction heating furnace.

The in-feed conveyor that feeds the metal tube into the preprocessing chamber by rotating and advancing the metal tube and an out-feed conveyor that feeds the coated metal tube out of the firing chamber.

Additional aspects and/or advantages of the invention will be set forth in part in the description which follows and, in part, will be obvious from the description, or may be learned by practice of the invention.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which:

FIG. 1 is a diagram illustrating an example of an enamel coating apparatus used in an enamel coating method according to an embodiment of the present invention;

DETAILED DESCRIPTION OF THE EMBODIMENTS

Figure 2A:
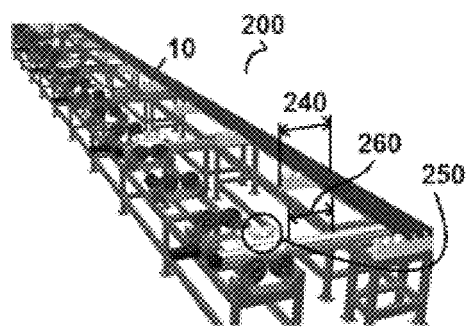
FIGS. 2A and 2B are diagrams illustrating an in-feed conveyor (a) of an enamel coating apparatus used in an enamel coating method according to an embodiment of the present invention and a configuration type (b) of a motor and a roller which are included in the in-feed conveyor.
Figure 2B:
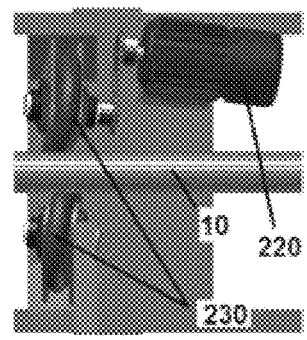

Exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention. When it is determined that the detailed description of known art related to the present invention may obscure the gist of the present invention, the detailed description thereof will be omitted.

As shown in FIGS. 1 to 9, an enamel coating method according to an embodiment of the present invention includes (a) preprocessing a surface of a metal tube 10 by feeding the metal tube, which advances while being rotated, into a preprocessing chamber 110 by an in-feed conveyor 200, (b) coating the surface of the metal tube 10 with an enamel glaze supplied from an enamel glaze supply nozzle 121 provided inside a coating chamber 120 by feeding the preprocessed metal tube 10 into the coating chamber 120, and (c) firing the coated metal tube 10 at a temperature of 750 to 1000° C. by feeding the coated metal tube 10 into a firing chamber 130.

In the (a) preprocessing, a heating means 111 is provided in the preprocessing chamber 110, and a preprocessing process of heating the metal tube 10 at a temperature of 300 to 600° C. for 10 seconds to 4 minutes using the heating means 111 is performed.

A preprocessing process of the metal tube in the (a) preprocessing may be performed by methods typically used in the related art, for example, a shot blasting method, a sand blasting method, a grit blasting method, and the like.

In addition, it is possible to preprocess the metal tube by wet preprocessing typically used in preprocessing of a metal, and it is possible to adopt a method of more efficiently remove foreign substances of the surface of the metal tube by generating ultrasound within a preprocessing solution at the time of the wet preprocessing.

However, oil-based components are not removed well by the blasting process, and when a wet process is adopted, the equipment is increased and the preprocessing process becomes complicated and causes deterioration in coating efficiency, and therefore the wet process is difficult to adopt for an automated enamel coating method according to an embodiment of the present invention.

Thus, in the enamel coating method according to an embodiment of the present invention, a method of burning and removing the oil-based components bonded to the surface of the metal tube 10 by heating the metal tube 10 at a high-temperature using the heating means 111 adopted in the preprocessing chamber 110 for a short period of time may be adopted.

The above-described high temperature heating process may be performed by the heating means 111 which is typically used. That is, as examples of the heating means, an electric furnace, a plasma heat treatment furnace, a heavy oil furnace, a light oil furnace, a gas furnace, a hydrogen heat treatment furnace, an induction heating furnace, and the like may be given.

Figure 4:
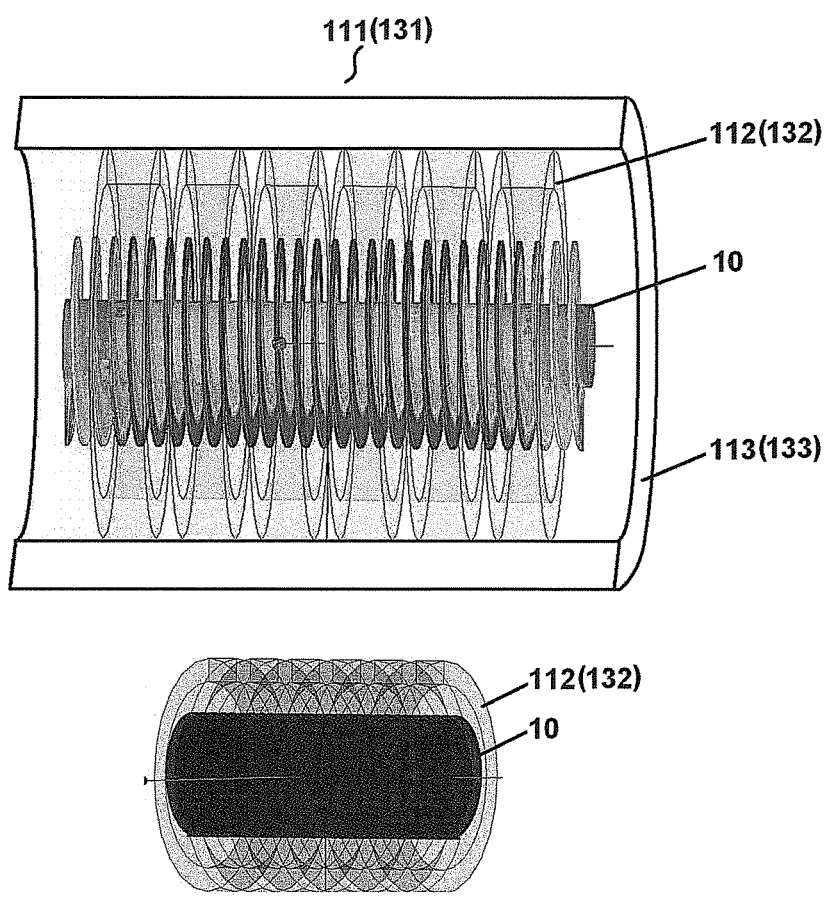
FIG. 4 is a schematic diagram illustrating a structure of an induction heater used in an enamel coating method according to an embodiment of the present invention.
Figure 5:
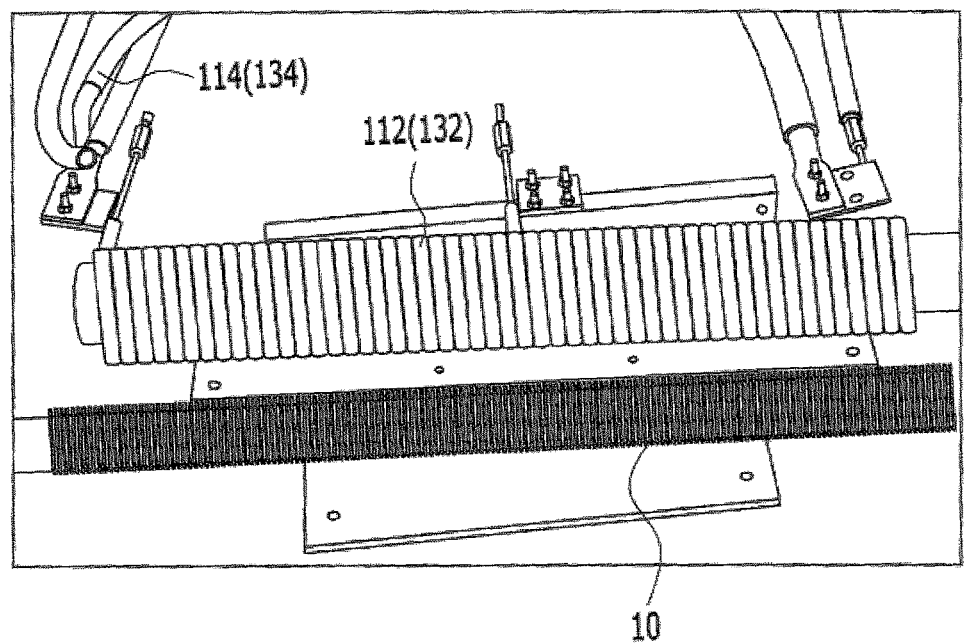
FIG. 5 is a photograph illustrating a manufacturing process of an induction heater used in an enamel coating method according to an embodiment of the present invention.

In the enamel coating method according to an embodiment of the present invention, an induction heater 111 may be particularly used as the induction heating furnace as shown in FIGS. 4 and 5. As the induction heater, a high-frequency induction heater using a high-frequency current may be used.

In the enamel coating method according to an embodiment of the present invention, the metal tube 10 is fed in while being rotated, and therefore the shape of the induction heater 111 is not an issue. That is, the metal tube 10 may be evenly heated regardless of what shape the induction heater 111 has, and therefore the shapes of the induction heater 111 known in the related art may all be used.

Figure 3:
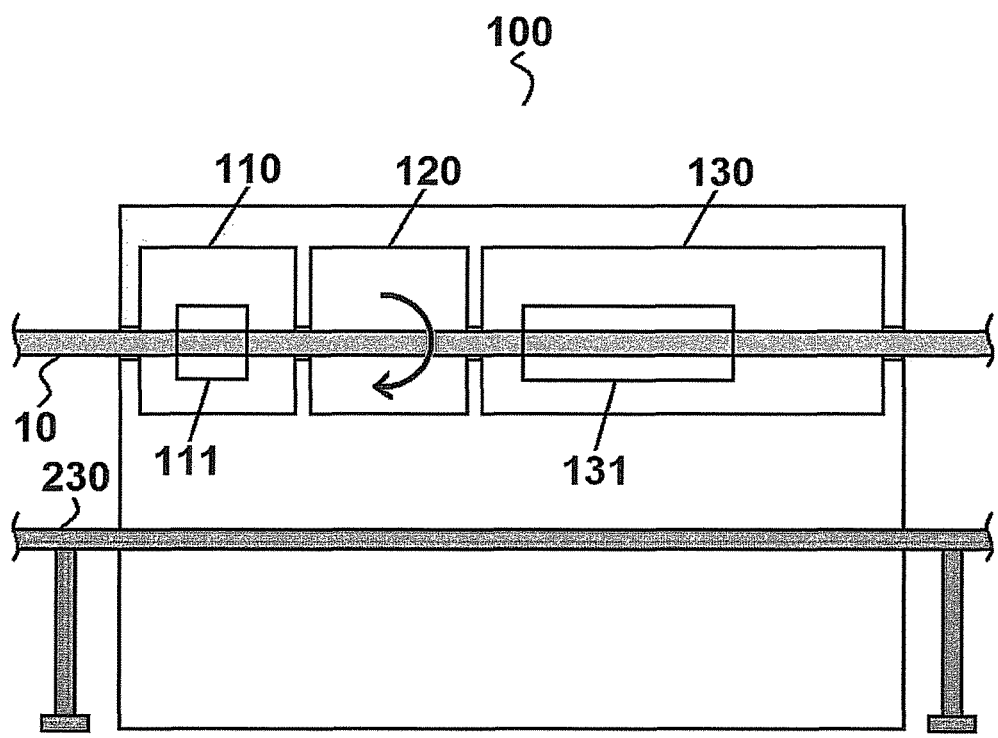
FIG. 3 is a schematic diagram illustrating a cross-section of a coating unit of an enamel coating apparatus used in an enamel coating method according to an embodiment of the present invention.

As the induction heater 111, as shown in FIGS. 3 to 5, the induction heater 111 which has a cylindrical or circular arc shape (not illustrated) with a radius of curvature 5 to 150 mm larger than an external diameter of the metal tube 10 may be used. The induction heater may be provided in a movement direction of the metal tube 10 so that a constant distance is maintained between the outer surface of the moved metal tube 10 and the inner curved surface of the induction heater.

The high-temperature heat treatment in the preprocessing process is performed at a temperature of 300 to 600° C., more preferably at a temperature of 400 to 500° C., for 10 seconds to 4 minutes, more preferably for 10 seconds to 2 minutes.

When the high-temperature heat treatment is performed at a temperature less than 300° C., removal of oil-based components is very time-consuming, and when the high-temperature heat treatment is performed at a temperature exceeding 500° C., economical efficiency is reduced. In addition, at less than 10 seconds, it is difficult to reach a required high-temperature, and at 5 minutes or more, decrease in productivity may be caused.

When the above-described high temperature heat treatment is performed using the induction heater 111, it is possible to heat the metal tube 10 to a heat treatment temperature (300 to 600° C.) within approximately one minute, and therefore the preprocessing chamber 110 may be readily miniaturized, and preprocessing costs may be significantly reduced.

In addition, the induction heater 111 may be readily manufactured in a small size so as to conform to the metal tube 10 having a relatively small diameter compared to the conventional heating means, and have excellent energy efficiency because heating is performed in close proximity.

As shown in FIG. 4, the induction heater 111 may be constituted of a heating coil 112 formed in a circular tunnel shape, and an alternating current (AC) power source (114 of FIG. 5) that supplies a current to the heating coil 112. Optionally, an insulation cover 113 may be provided in the outer periphery of the heating coil 112.

As shown in FIG. 4, when the metal tube 10 is inserted into the circular tunnel shape formed as the heating coil 112 to supply an AC, electrical resistance caused by an eddy current occurs, and therefore heat is generated on the surface of the metal tube.

FIG. 5 is a photograph illustrating a manufacturing process of the induction heater 111 used in an enamel coating method according to an embodiment of the present invention. As shown in FIG. 5, the induction heater 111 is formed in a circular tunnel shape to supply the AC power source 114.

Figure 6:
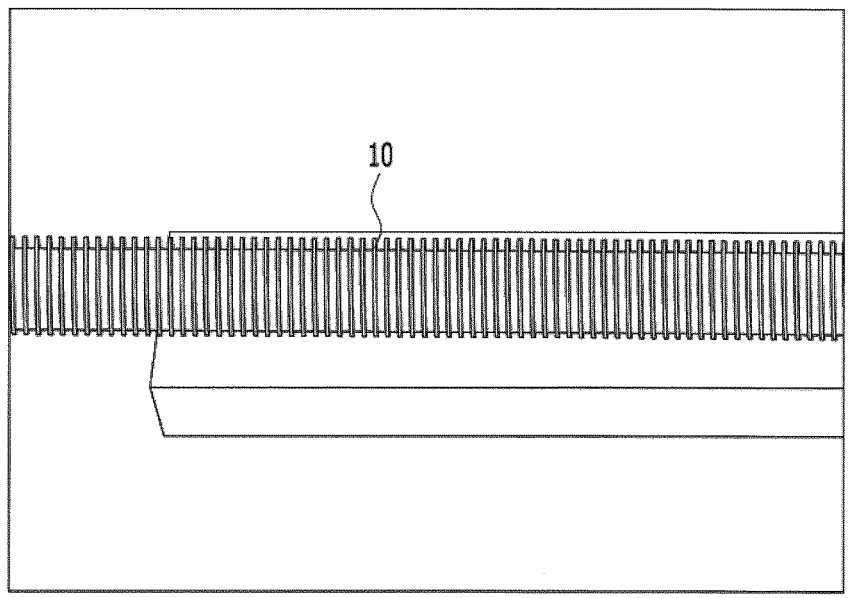
FIG. 6 is a photograph illustrating a metal tube heated by an induction heater used in an enamel coating method according to an embodiment of the present invention.

FIG. 6 is a photograph illustrating a state of the metal tube 10 heated by the induction heater 111 manufactured in FIG. 5. As can be seen from FIG. 6, the whole tube is heated to be red.

As can be seen from FIGS. 5 and 6, the surface temperature of the metal tube 10 reaches a temperature of 400° C. 18 seconds after starting heating, and reaches a temperature of 680° C. in 56 seconds. Thus, the high-temperature pre-processing of the metal tube 10 can be completed within approximately one minute by the induction heater 111.

In the (b) coating of the surface of the coating object 10, an air spray nozzle 123 is provided behind the enamel glaze supply nozzle 121 in an advancing direction of the metal tube 10 inside the coating chamber 120, and the (b) coating of the surface of the coating object 10 includes spraying air toward the metal tube 10 from the air spray nozzle 123 at a speed of 0.05 m/s to 1.5 m/s.

Figure 7:
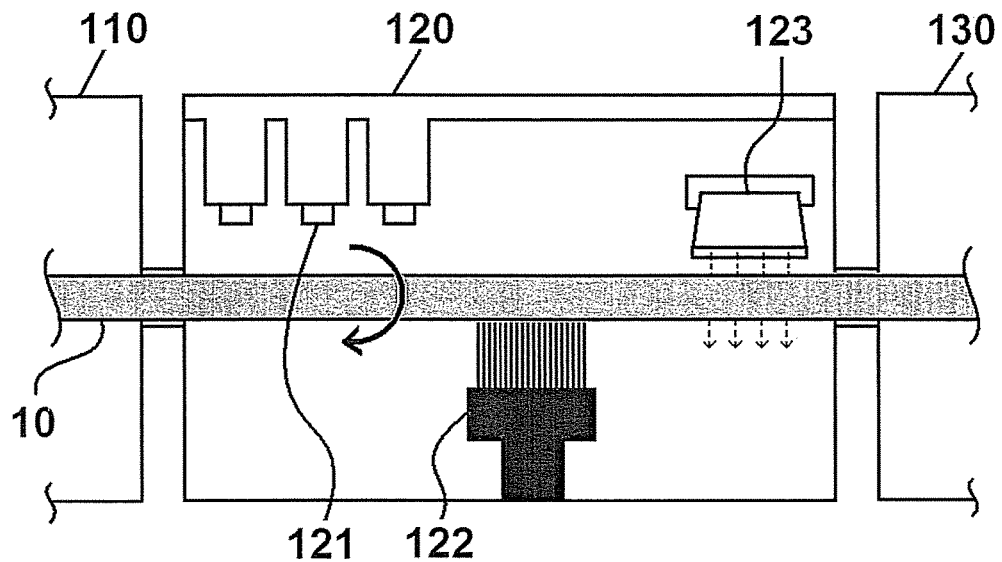
FIG. 7 is a schematic diagram illustrating a coating chamber (general tube coating) included in a coating unit of an enamel coating apparatus used in an enamel coating method according to an embodiment of the present invention.
Figure 8:
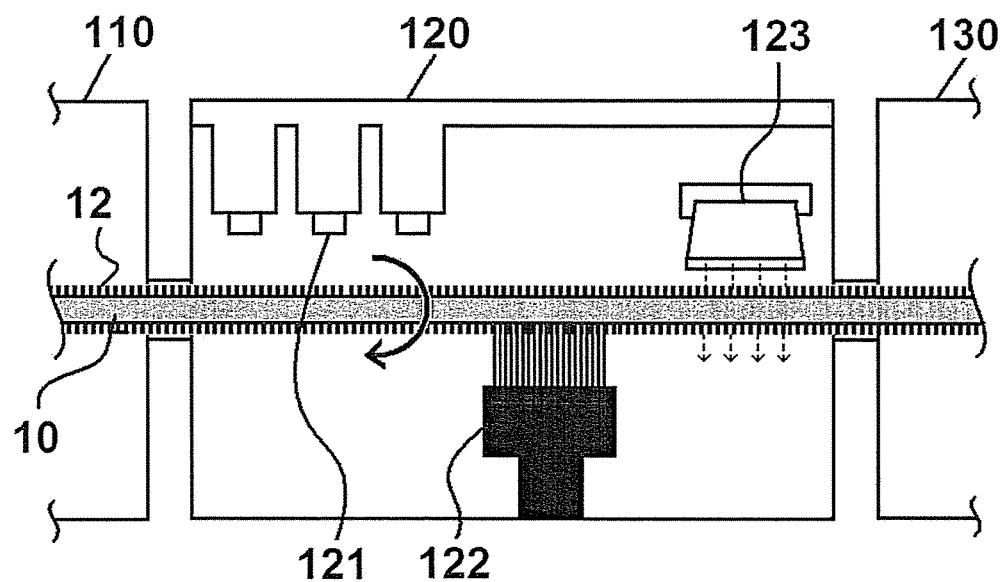
FIG. 8 is a schematic diagram illustrating a coating chamber (pin tube coating) included in a coating unit of an enamel coating apparatus used in an enamel coating method according to an embodiment of the present invention.

In the (b) coating of the surface of the metal tube 10, as shown in FIGS. 7 and 8, by feeding the metal tube 10 which advances while being rotated into the coating chamber 120, the surface of the metal tube (10) is coated with an enamel glaze supplied from the enamel glaze supply nozzle 121 provided inside the coating chamber 120.

In addition, by bringing the coating brush 122 provided behind the enamel glaze supply nozzle 121 in the advancing direction of the metal tube 10 into contact with the surface of the metal tube 10 which advances while being rotated, it is possible to simultaneously remove excessive enamel glaze applied to the surface of the metal tube 10 and air bubbles formed inside the coating film.

In addition, the air spray nozzle 123 is provided behind the enamel glaze supply nozzle 121, and therefore, by spraying air to the surface of the metal tube 10, which advances while being rotated, at a speed of preferably 0.05 m/s to 1.5 m/s, more preferably 0.1 m/s to 1.0 m/s, the excessive enamel glaze applied to the surface of the metal tube 10 and the air bubbles formed inside the coating film are simultaneously removed, and the applied enamel glaze is dried.

When the above-described spray speed of the air is less than 0.05 m/s, the effect of the air spray is difficult to ensure, and when the spray speed exceeds 1.5 m/s, the applied enamel glaze is excessively removed.

When performing the air spray process by the air spray nozzle 123, the excessive enamel glaze may be easily removed from the surface of the metal tube, the air bubbles formed inside the coating film may be efficiently removed, and by primarily drying the enamel glaze applied to the surface of the metal tube in the previous step of the firing, it is possible to prevent formation of an unsmooth coating surface formed in such a manner that the enamel glaze falls in the direction of gravity to be hardened in the firing processing.

In addition, by efficiently removing the air bubbles formed on the surface of the metal tube in the coating process of the enamel glaze, it is possible to form a uniform and solid coating film. In particular, when coating the metal tube (for example, metal pin tube) with severe irregularities formed thereon, it is possible to very easily remove the air bubbles which are unevenly formed and difficult to remove using the existing method.

The air spray nozzle 123 is constituted of a hot air spray nozzle, and it is more preferable that the air sprayed from the air spray nozzle 123 be hot air of 30 to 200° C. When spraying the hot air as described above, removal of the air bubbles may be more efficiently achieved, and drying the applied enamel glaze before the metal tube 10 enters the firing chamber 13 may be more efficiently achieved.

As shown in FIG. 7, a required number of the enamel glaze supply nozzles 121 may be provided in an advancing direction of the coating tube in the upward direction of the fed coating tube 10. However, this is merely an example, and various kinds of enamel glaze supply nozzles 121 may be freely provided in various places. When the enamel glaze flows out or is sprayed from the enamel glaze supply nozzle 121, the enamel glaze is uniformly applied to the metal tube 11 which advances while being rotated.

The installation position of the coating brush 122 is not limited as long as the coating brush 122 is provided behind the enamel glaze supply nozzle 121 in the advancing direction of the metal tube 10, and the type of the coating brush 122 is not limited as long as the coating brush 122 can simultaneously remove the excessive enamel glaze applied to the metal tube 10 and the air bubbles formed inside the coating film.

When the metal tube 10 is a pin tube in which a heat transfer pin 12 is formed on the surface of the tube, a single fiber constituting the coating brush 122 should have an appropriate strength and thickness in order for the enamel glaze to be uniformly applied to the heat transfer pin.

The installation position of the air spray nozzle 123 is not limited as long as the air spray nozzle 123 is provided behind the enamel glaze supply nozzle 121 in the advancing direction of the metal tube 10, and the type of the air spray nozzle 123 is not limited as long as the air spray nozzle 123 can simultaneously remove the excessive enamel glaze applied to the metal tube 10 and the air bubbles formed inside the coating film.

Figure 9:
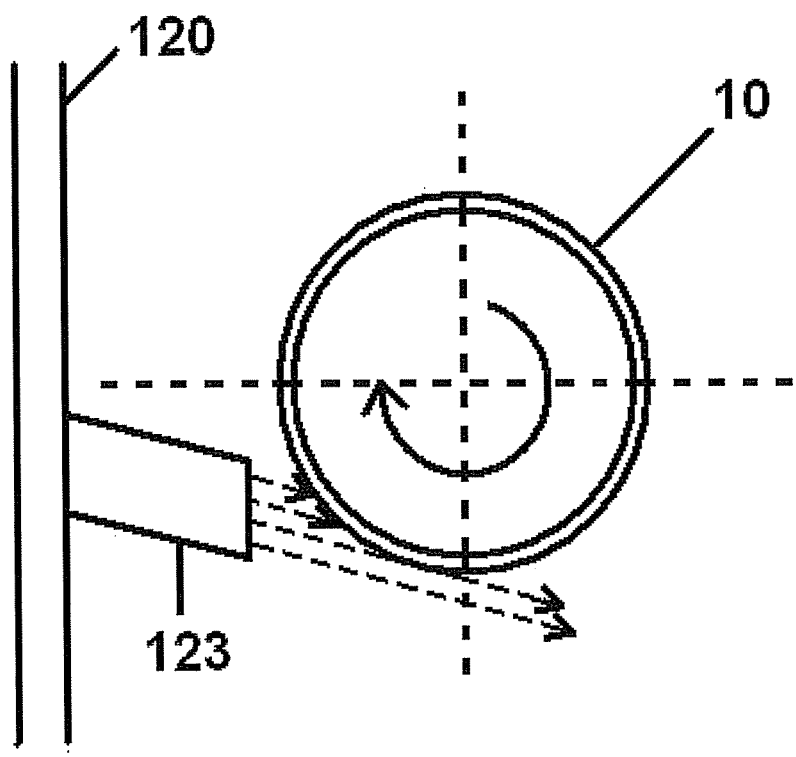
FIG. 9 is a schematic diagram illustrating an air spray direction of an air spray nozzle used in an enamel coating method according to an embodiment of the present invention.

In particular, as shown in FIG. 9, preferably, the air spray nozzle 123 is provided in such a manner that air is sprayed in a direction opposite to a rotating direction of the metal tube 10 and the sprayed air reaches the lowest end of the metal tube 10. The air spray nozzle 123 is mounted downwardly inclined on an inner wall of the coating chamber 120.

As described above, when the sprayed air reaches the lowest end of the metal tube 10 which advances while being rotated, the excessive enamel glaze applied to the surface of the metal tube 10 is easily assembled to the bottom of the tube by the sprayed air, and easily falls downward to be removed by the action of gravity. In addition, spraying the air in the direction opposite to the rotating direction of the metal tube 10 is preferable to spraying the air in the same direction as the rotating direction of the metal tube 10 in that the removal of the excessive enamel glaze can be more efficiently achieved.

Figure 10A:
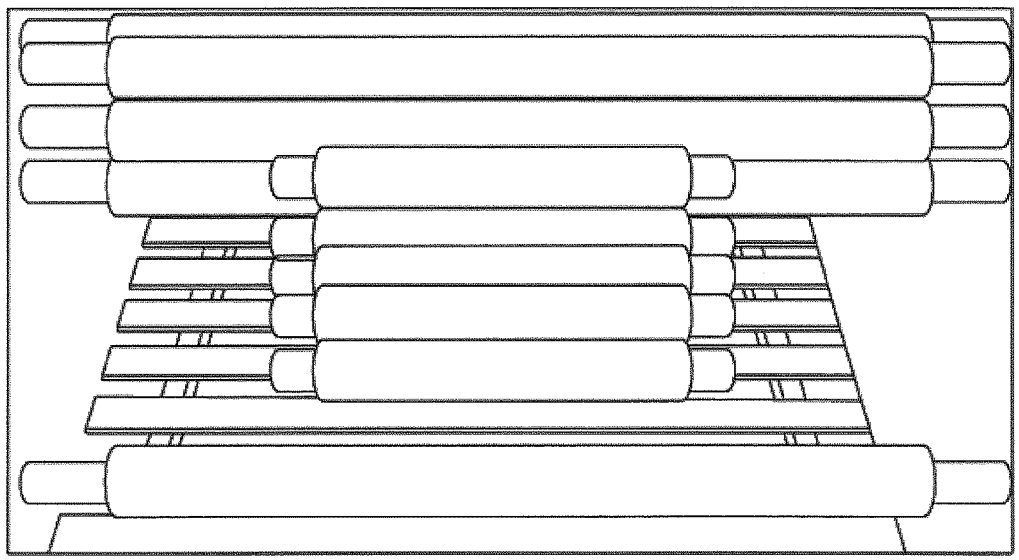
FIGS. 10A, 10B and 10C are photographs illustrating a pin tube coated by an enamel coating method according to an embodiment of the present invention.
Figure 10B:
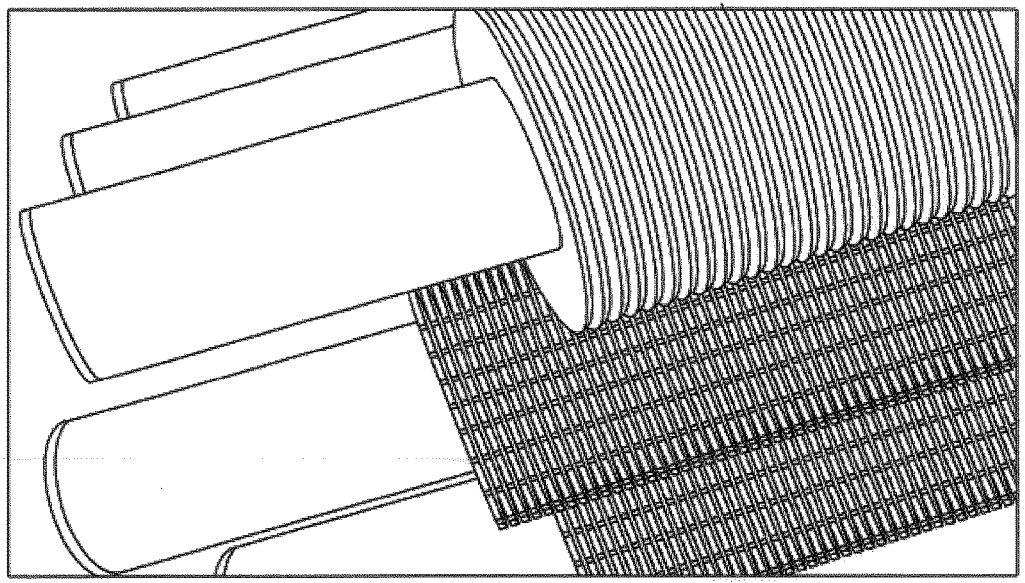
Figure 10C:
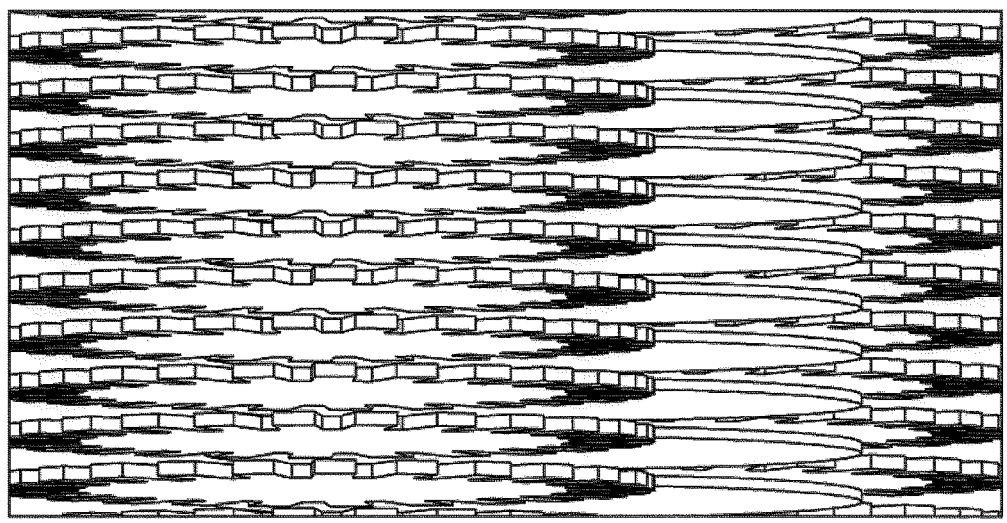

The enamel coating method according to an embodiment of the present invention has the coating brush 122 and/or the air spray nozzle 123, and therefore excellent effects may be achieved even when coating the metal tube having a complex surface shape such as a pin tube for heat exchanger (10 of FIG. 10) in which the heat transfer pin 12 is formed on the surface of the tube.

In the (c) firing, a heating means 131 is provided in the firing chamber 130, and the (c) firing includes heating the coated coating object to a temperature of 750 to 1,000° C. by the heating means 131.

It is more preferable that a high-temperature firing process of the metal tube in the (c) firing be performed at a temperature of 750 to 870° C. As the heating means 131, one which is typically used in the related art may be used without restriction, and for example, an electric furnace, a plasma heat treatment furnace, a heavy oil furnace, a light oil furnace, a gas furnace, a hydrogen heat treatment furnace, an induction heating furnace, or the like may be used.

According to an embodiment of the present invention, as the heating means 131, the induction heating furnace may be used. As the induction heating furnace, the induction heater 131 as shown in FIG. 3 may be used. The induction heater 131 may be manufactured in a small size so as to conform to the metal tube 10 having a relatively small diameter compared to the conventional heating means, and have excellent energy efficiency because heating is performed in close proximity.

In particular, the metal tube 10 is heated by an induction heating method, so that heat is generated only on the surface of the metal tube that is a conductor. Thus, the metal tube is first heated and the enamel glaze applied to the surface of the metal tube is heated by the generated heat, and therefore the enamel glaze is more uniformly and firmly bonded to the surface of the metal tube. In addition, coating defects may be reduced.

On the other hand, when the metal tube 10 is heated by the conventional heating means, heat is transferred to the metal tube through the enamel glaze applied to the outer surface of the metal tube, and therefore the enamel glaze is first heated to flow down in the direction of gravity before the metal tube is heated. As a result, coating defects may easily occur, and rigidity of the coating may be reduced compared to the induction heating method.

The metal tube 10 in the enamel coating method according to an embodiment of the present invention is fed in while being rotated, and therefore the shape of the induction heater 131 is not an issue. That is, the metal tube 10 may be evenly heated regardless of what shape the induction heater 131 has, and therefore the shapes of the induction heater 131 known in the related art may all be used.

The induction heater 131 may be the same as the induction heater 111 of the preprocessing chamber 110 as shown in FIGS. 3 to 5, and may be constituted of a heating coil 132, an AC power source (134 of FIG. 5), and an insulation cover 133 which are the same as the heating coil 112, the AC power source 114, and the insulation cover 113 of the preprocessing chamber 110.

As can be seen from FIGS. 5 and 6, the surface temperature of the metal tube 10 reaches a temperature of 800° C. one minute and 11 seconds after starting heating. Thus, it can be confirmed that the firing of the metal tube 10 is completed within approximately 2 seconds by the induction heater 131.

As the induction heater 131 in the enamel coating method according to an embodiment of the present invention, a high-frequency induction heater using a high-frequency current may be used.

In the (c) firing, the firing process of the metal tube is performed at a high temperature of 750 to 1,000° C. Thus, when the metal tubes 10 are connected with each other so that front and rear ends of the metal tubes are not mutually supported, bending or distortion may occur in portions of the metal tubes which are not supported while passing through the firing chamber 130. Thus, in the enamel coating method according to an embodiment of the present invention, the preprocessing process, the coating process, and the firing process are performed by connecting the rear end portion of the corresponding metal tube with another metal tube 10 before the rear end portions of the metal tubes 10 are fed into the preprocessing chamber 110, thereby minimizing occurrence of the bending or distortion.

The connection between the metal tubes 10 may be automatically or manually performed using various connection members which are known in the art. In the enamel coating method according to an embodiment of the present invention, rotational force and advancing power of the metal tube are transmitted through the above-described connection member, and therefore a connection member capable of achieving a strong bond between the metal tubes is preferably used.

Figure 12:
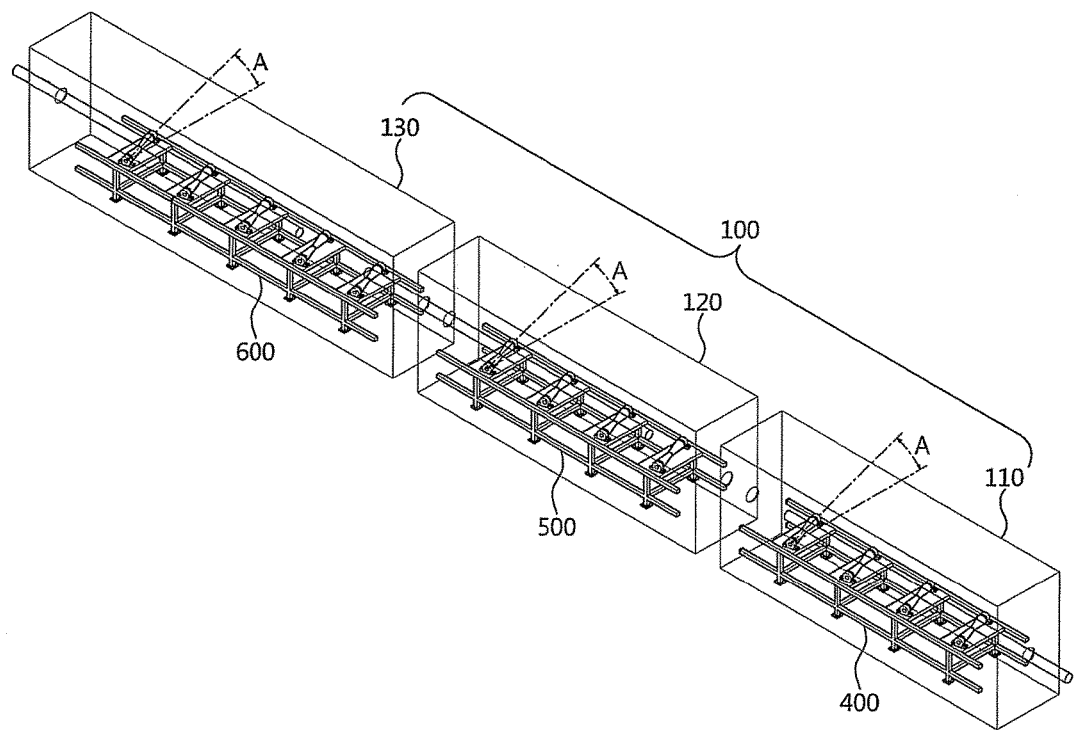
FIG. 12 is a schematic diagram illustrating a preprocessing chamber conveyor 400, a coating chamber conveyor 500, and a firing chamber conveyor 600 of an enamel coating apparatus used in an enamel coating method according to an embodiment of the present invention.
Figure 13:
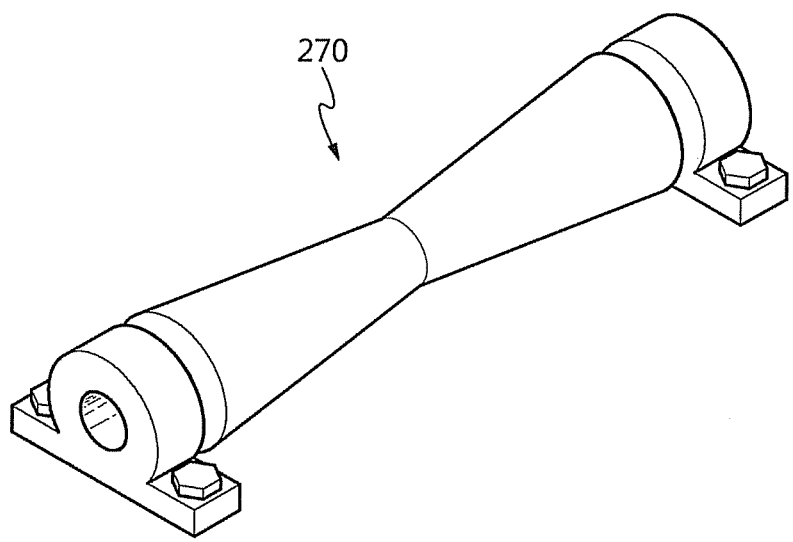
FIG. 13 is a perspective diagram illustrating a transport roller used in an enamel coating apparatus according to an embodiment of the present invention.

In addition, according to the enamel coating method according to an embodiment of the present invention, in order to more completely prevent distortion of the metal tube 10 in the firing process, a firing chamber conveyor 600 for supporting, rotating, and advancing the metal tube 10 is further provided as shown in FIG. 12, so that the high-temperature metal tube 10 passing through the firing chamber 130 is supported to prevent distortion of the metal tube 10.

As shown in FIG. 12, the firing chamber conveyor 600 may include a large number of transport rollers 270 provided on an axis forming an angle of 5° to 35° clockwise or counterclockwise with a lateral line perpendicular to a longitudinal direction of the firing chamber conveyor 600, more preferably an angle of 10° to 30°.

The transport roller 270 is a rod with a circular cross-section, and has a tapered shape in which a diameter of the transport roller 270 is gradually increased toward both end portions thereof from a central portion thereof.

When such a transport roller 270 is provided on the axis forming the angle of 5° to 35° clockwise or counterclockwise with the lateral line perpendicular to the longitudinal direction of the firing chamber conveyor 600 and is rotated by directly or indirectly supplied power, the transport roller 270 simultaneously rotates and advances the metal tube 10 placed thereon. The distorted angle of the axis of the transport roller 270 serves to determine the number of rotations of the metal tube 30. The number of rotations of the metal tube in the enamel coating method according to an embodiment of the present invention is, for example, 2 to 10 per minute, preferably 5 to 9 per minute, and the distorted angle of the axis of the transport roller 270 may be adjusted based on the number of rotations of the metal tube.

As the configuration of the firing chamber conveyor 600 except for the transport roller 270, a configuration typically used in the related art may be adopted. The power transmission by the transport roller 270 may be performed by a method typically used in the related art.

The material of the transport roller 270 is not limited as long as it can withstand a high temperature (750 to 1,000° C.), and a metal is preferably used as the material of the transport roller 270.

The firing process of the metal tube is performed at the high temperature, and therefore the firing chamber conveyor 600 provided in the firing chamber 130 should have excellent heat resistance. In particular, the transport roller 270 is brought into direct contact with the metal tube heated to the high temperature, and therefore should have heat resistance. However, materials having heat resistance capable of withstanding the temperature 750 to 1,000° C. are uncommon and expensive, and therefore in the enamel coating method according to an embodiment of the present invention, a method of cooling the transport roller 270 using a cooling solvent has been suggested.

Figure 14:
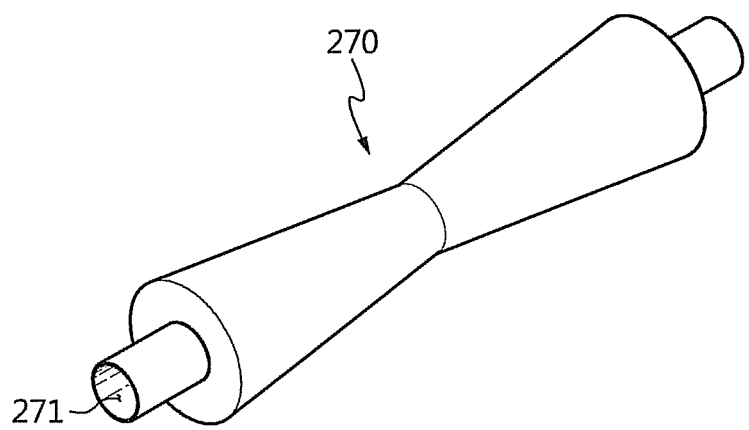
FIG. 14 is a perspective diagram illustrating a transport roller including a cooling liquid circulation path 271 used in an enamel coating apparatus according to an embodiment of the present invention.

That is, the transport roller 270 included in the firing chamber conveyor 600 in the enamel coating method according to an embodiment of the present invention includes a cooling liquid circulation path 271 that passes through a rotating shaft as shown in FIG. 14. When a cooling liquid such as cooling water is circulated through the cooling liquid circulation path 271, the transport roller 270 is not affected even at a firing temperature (750 to 1,000° C.) of the metal tube.

In the enamel coating method according to an embodiment of the present invention, the continued rotation and advancing of the metal tube 10, as shown in FIGS. 1 and 2, may be performed by a motor 220 provided in the in-feed conveyor 200 and/or the out-feed conveyor 300 and several pairs of rotation rollers 230 forming an alternate angle so that the metal tube advances while being rotated by the power received from the motor 220.

Figure 11:
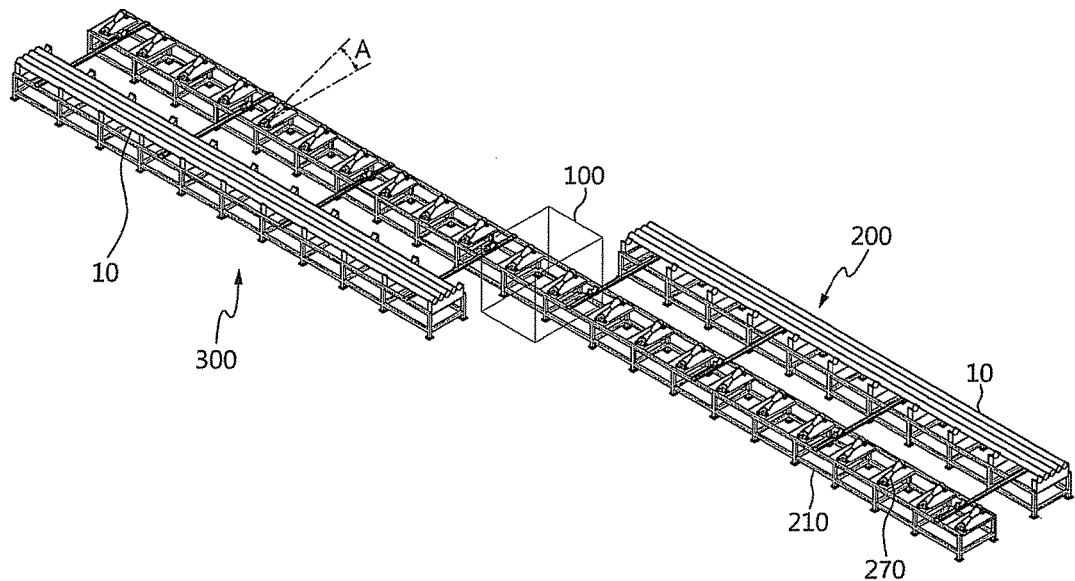
FIG. 11 is a schematic diagram illustrating an enamel coating apparatus adopting a transport roller used in an enamel coating method according to an embodiment of the present invention.

In addition, as shown in FIGS. 11 and 12, the continued rotation and advancing of the metal tube 10 may be performed by the motor (not shown) provided in the in-feed conveyor 200 and/or the out-feed conveyor 300 and the transport roller 270 that receives the power from the motor advance the metal tube 10 while rotating.

When the above-described transport roller 270 is used in the conveyor, the roller is simplified, and therefore simplification of the entire apparatus may be achieved.

The number of rotations of the metal tube in the enamel coating method according to an embodiment of the present invention is, for example, 2 to 10 per minute, and preferably 5 to 9 per minute. The number of rotations of the metal tube may be adjusted by adjusting the alternate angle of the rotation roller (230 of FIG. 2B) or adjusting the distorted angle of the axis of the hourglass roller (270 of FIG. 11).

In the enamel coating method according to an embodiment of the present invention, when the in-feed conveyor 200 and the out-feed conveyor 300 are used as shown in FIGS. 1 and 2 and the preprocessing process, the coating process, and the firing process are performed by connecting the rear end portion of the corresponding metal tube 10 with another metal tube 10 before the metal tube 10 is fed into the preprocessing chamber 110, a separate preprocessing chamber conveyor 400, coating chamber conveyor 500, and firing chamber conveyor 600 are not required. That is, according to an embodiment of the present invention, when a coating unit 100 including the preprocessing chamber 110, the coating chamber 120, and the firing chamber 130 is compact and the length of the coating unit 100 is significantly smaller than the length of the metal tube to be coated, the continued rotation and advancing of the metal tube 10 may be performed by the in-feed conveyor 200 and the out-feed conveyor 300 provided in front of and behind the preprocessing chamber 110, the coating chamber 120, and the firing chamber 130 even without using separate conveyors for the preprocessing chamber 110, the coating chamber 120, and the firing chamber 130.

Meanwhile, when each of the metal tubes 10 is individually coated without performing the preprocessing process, the coating process, and the firing process by connecting the rear end portion of the corresponding metal tube 10 with another metal tube 10 before the metal tube 10 is fed into the preprocessing chamber 110, at least one of the preprocessing chamber conveyor 400, the coating chamber conveyor 500, and the firing chamber conveyor 600 may be required in order for each of the metal tubes 10 to have rotational force and advancing power in the preprocessing process, the coating process, and the firing process.

In the related art, the firing chamber capable of receiving the metal tube is required for enamel coating of the metal tube, however, in an enamel coating apparatus according to an embodiment of the present invention, enamel coating may be easily performed with respect to even a long metal tube in the coating unit including the compact firing chamber. Thus, in the enamel coating method according to an embodiment of the present invention, when the length of the metal tube is 5 m or more, a greater economical advantage may be achieved than in the related art. For example, when coating is performed in the conventional method in a case in which a length of a pin tube for heat exchanger used in a generator is 18 m, the firing chamber having a space of 18 m or more is required, whereby uneconomical results are obtained in terms of energy efficiency and use of space. However, according to an embodiment of the present invention, the firing process may be easily and economically performed in the compact firing chamber (the overall length being approximately 4 m or less).

Hereinafter, the enamel coating apparatus according to an embodiment of the present invention will be described in detail with reference to FIGS. 1 to 14.

The enamel coating apparatus according to an embodiment of the present invention includes the preprocessing chamber 110 that preprocesses the surface of the metal tube 10 that is fed from the in-feed conveyor 200 while being rotated, the coating chamber 120 that coats the surface of the metal tube 10 with an enamel glaze supplied from the enamel glaze supply nozzle 121 provided therein when the preprocessed metal tube 10 is fed, and the coating unit 100 that includes the firing chamber 130 performing firing at a temperature of 750 to 1000° C. when the coated metal tube 10 is fed.

The heating means for heating the metal tube at a temperature of 300 to 600° C. is provided in the preprocessing chamber.

The air spray nozzle 123 is provided behind the enamel glaze supply nozzle 121 in an advancing direction of the metal tube 10 inside the coating chamber 120, and sprays air toward the metal tube at a speed of 0.05 m/s to 1.5 m/s.

All technical features described in the enamel coating method may be applied to the enamel coating apparatus, and repeated description thereof will be omitted.

The coating unit 100 is preferably provided in such a manner that the overall length of the metal tube is 5 m or less in a direction in which the metal tube is fed.

In the enamel coating apparatus, the preprocessing chamber 110 of the coating unit 100 is provided to have an overall length of 3 m or less, preferably 1 m or less in the direction in which the metal tube 10 is fed, the coating chamber 120 is provided to have an overall length of 2 m or less, preferably 1 m or less, and the firing chamber 130 is provided to have an overall length of 7 m or less, preferably 5 m or less, whereby miniaturization of the coating unit 100 may be achieved.

The enamel coating apparatus according to an embodiment of the present invention further includes the in-feed conveyor 200 that feeds the metal tube 10 into the preprocessing chamber 110 by allowing the metal tube 10 to be rotated and advance, and the out-feed conveyor 300 that feeds the coated metal tube 10 out of the firing chamber 130.

In this instance, as shown in FIG. 2A, the in-feed conveyor 200 includes a metal tube carrying unit 240, a metal tube loading unit 250, and a metal tube transport unit 260 for transporting the metal tube from the metal tube carrying unit 240 to the loading unit, and the metal tube transport unit 260 transports the metal tube 10 from the metal tube carrying unit 240 to the metal tube loading unit 250 in a staggered manner so that the metal tube 10 can be continuously supplied to the coating unit 100.

In addition, the above-described configuration may be applied to the out-feed conveyor 300. In the out-feed conveyor 300, the coated metal tube 11 is transported from the metal tube loading unit 250 to the metal tube carrying unit 240.

According to the enamel coating method according to embodiments of the present invention, oil-based components bonded to the surface of the metal tube may be completely removed within a short time (within approximately one minute) by the heating means in the preprocessing process, thereby significantly improving the enamel coating efficiency of the metal tube.

In addition, the coating defects may be minimized, and the enamel glaze may be uniformly and firmly bonded to the surface of the metal tube, thereby performing enamel coating having excellent durability.

In addition, the excessive enamel glaze may be easily removed from the surface of the metal tube in the coating process of the enamel glaze, and the air bubbles formed inside the coating film may be efficiently removed. In addition, by primarily drying the enamel glaze applied to the surface of the metal tube in the previous step of the firing, it is possible to prevent formation of an unsmooth coating surface formed in such a manner that the enamel glaze falls in the direction of gravity to be hardened in the firing processing.

In addition, by efficiently removing the air bubbles formed on the surface of the metal tube in the coating process of the enamel glaze, a uniform and firm coating film may be formed.

In particular, in the case of the metal tube (metal pin tube) having severe irregularities formed thereon, the oil-based components bonded to the surface of the metal tube may be completely removed, enamel coating having excellent durability may be performed on the entire surface and the air bubbles which are difficult to remove in the existing method may be significantly easily removed.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. An enamel coating apparatus comprising:
    an in-feed conveyor feeding a metal tube longitudinally and rotating the metal tube;
    a preprocessing chamber that preprocesses a surface of the metal tube fed from the in-feed conveyor while being rotated;
    a coating chamber that coats the surface of the metal tube with an enamel glaze supplied from an enamel glaze supply nozzle provided therein when the preprocessed metal tube is fed; and
    a firing chamber for firing the coated metal tube when the coated metal tube is fed,
    wherein an air spray nozzle for spraying air toward the metal tube is provided inside the coating chamber,
    wherein the air spray nozzle sprays the air in a direction opposite to a rotating direction of the metal tube, and is provided such that the sprayed air is aimed at the lowest end of the metal tube, the air spray nozzle being mounted on an inner wall of the coating chamber and downwardly inclined.

2. The enamel coating apparatus of claim 1, wherein the air spray nozzle is provided behind the enamel glaze supply nozzle with respect to an advancing direction of the metal tube, and air is sprayed at a speed of 0.05 m/s to 1.5 m/s from the air spray nozzle.

3. The enamel coating apparatus of claim 2, wherein the air spray nozzle is a hot air spray nozzle capable of spraying hot air of 30 to 200° C.

4. The enamel coating apparatus of claim 2, wherein a coating brush is further provided between the enamel glaze supply nozzle and the air spray nozzle.

5. The enamel coating apparatus of claim 2, wherein a heating means capable of heating the metal tube to a temperature of 300 to 600° C. is provided in the preprocessing chamber.

6. The enamel coating apparatus of claim 5, wherein the heating means is any one of an electric furnace, a plasma heat treatment furnace, a heavy oil furnace, a light oil furnace, a gas furnace, a hydrogen heat treatment furnace, and an induction heating furnace.

7. The enamel coating apparatus of claim 6, wherein the heating means is an induction heater as the induction heating furnace.

8. The enamel coating apparatus of claim 5, further comprising:
    an out-feed conveyor that feeds the coated metal tube out of the firing chamber.

9. The enamel coating apparatus of claim 1, wherein the preprocessing chamber performs wet preprocessing using ultrasound.

* * * * *